United States Patent
Fang et al.

(10) Patent No.: US 10,380,091 B2
(45) Date of Patent: Aug. 13, 2019

(54) INDEX B-TREE MAINTENANCE FOR LINEAR SEQUENTIAL INSERTION

(71) Applicant: International Business Machines Corporation, Armonk, NY (US)

(72) Inventors: Min Fang, Beijing (CN); Di Jin, Beijing (CN); Zhen Yu Shi, Beijing (CN); Nigel G. Slinger, Los Gatos, CA (US); Shu Wang, Beijing (CN); Li Fei Zheng, ShangHai (CN); Wen Jie Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 15/223,010

(22) Filed: Jul. 29, 2016

(65) Prior Publication Data
US 2018/0032560 A1 Feb. 1, 2018

(51) Int. Cl.
*G06F 17/30* (2006.01)
*G06F 16/22* (2019.01)

(52) U.S. Cl.
CPC .................. *G06F 16/2246* (2019.01)

(58) Field of Classification Search
CPC .......... G06F 17/30327; G06F 16/2246
See application file for complete search history.

(56) References Cited

U.S. PATENT DOCUMENTS

| | | | |
|---|---|---|---|
| 5,644,763 A * | 7/1997 | Roy | G06F 17/30327 |
| 5,806,065 A | 9/1998 | Lomet | |
| 6,622,141 B2 | 9/2003 | Lee et al. | |
| 7,599,949 B1 | 10/2009 | Plasek et al. | |
| 7,941,451 B1 | 5/2011 | Ritchie et al. | |
| 8,200,633 B2 * | 6/2012 | Bendakovsky | G06F 11/1458 707/640 |
| 8,682,872 B2 | 3/2014 | Bright | |
| 9,507,843 B1 * | 11/2016 | Madhavarapu | G06F 17/30575 |
| 2001/0042240 A1 | 11/2001 | Ng et al. | |
| 2007/0005631 A1 | 1/2007 | Barsness et al. | |
| 2008/0114787 A1 * | 5/2008 | Kashiyama | G06F 17/30312 |

OTHER PUBLICATIONS

Gudes et al., "Experiments With B-Tree Reorganization", SIGMOD '80 Proceedings of the 1980 ACM SIGMOD International Conference on Management of data, 1980, pp. 200-206.

(Continued)

*Primary Examiner* — Jared M Bibbee
(74) *Attorney, Agent, or Firm* — Gilbert Harmon, Jr.

(57) ABSTRACT

An approach for index B-tree page creation associated with linear sequential insertions in database management systems (DBMS). A linear pre-splitter receives a current index leaf page for linear sequential insertion. The linear pre-splitter asynchronously creates index leaf pages where the current index leaf page is in a predetermined position at least one page away from a last index leaf page. The linear pre-splitter updates index leaf page position identifiers associated with the index leaf pages where the index leaf page position identifiers link the index leaf pages and the last index leaf page and the linear pre-splitter inserts index leaf page identifiers and index key metadata associated with each of the index leaf pages into index non-leaf pages.

13 Claims, 4 Drawing Sheets

(56) References Cited

OTHER PUBLICATIONS

Mohan et al., "ARIES/IM: An Efficient and High Concurrency Index Management Method Using Write-Ahead Logging", 1992 ACM SIGMOD 6/92 CA, USA, © 1992 ACM 0-89791-522-4/92/0005/0371, pp. 371-380.

Fang et al., "Index B-Tree Maintenance for Linear Sequential Insertion", U.S. Appl. No. 15/811,742, filed Nov. 14, 2017, 29 pages.

IBM, Appendix P, list of patents or patent applications treated as related, filed herewith, 2 pages.

* cited by examiner

INDEX B-TREE MAINTENANCE FOR LINEAR SEQUENTIAL INSERTION

BACKGROUND OF THE INVENTION

The present invention relates generally to relational database systems, and more specifically, to maintenance of an index B-Tree during repetitive sequential database inserts.

An index B-Tree (e.g., binary tree index) is a data structure that can be used by a Database Management System (DBMS) and/or Relational Database Management System (RDBMS) to organize index data (e.g., data table key fields, index key values, etc.) in a logical tree, maintained in a sorted arrangement, to enable efficient index data searching.

As data records are inserted into database table(s), corresponding index entries are added to an index B-Tree in an appropriate position in an index leaf page (e.g., an allocated space representing a group of index entries and/or B-Tree leaves) based on an index value magnitude positioned between other respective lower or higher index value B-Tree leafs (e.g., index entries). Each index leaf page has a fixed size in a DBMS and when an insert operation exceeds the capacity of an index leaf page (e.g., B-Tree leaf consumption) an "index split" operation is performed. An "index split" allocates and creates a new index leaf page and moves part of the information from an original index leaf page into the new index leaf page. The index split results in two index leaf pages comprising empty B-Tree leaves capable of storing additional data (e.g., index key values).

The process of performing an index B-Tree split and the effect on modifying a B-Tree structure can be considered an expensive DBMS operation due to the overhead of copying and arranging data in an index B-Tree during the index split. As page space is allocated during an index split, computing resources such as, but not limited to, CPU and I/O can cause index locking and during numerous linear sequential insert operations, index leaf pages can become quickly filled. When available B-Tree pages are exhausted, an index split can be performed and as each new B-Tree page is created and filled, a linear sequential insert operation can be slowed due to pauses caused by each index split (e.g., synchronous operation).

SUMMARY

As disclosed herein, a method for index B-tree page creation associated with linear sequential insertions in database management systems (DBMS), the method comprising: receiving, by a linear pre-splitter, a current index leaf page for linear sequential insertion; asynchronously creating, by the linear pre-splitter, one or more index leaf pages wherein the current index leaf page is in a predetermined position at least one page away from a last index leaf page; updating, by the linear pre-splitter, one or more index leaf page position identifiers associated with the one or more index leaf pages wherein the one or more index leaf page position identifiers link the one or more index leaf pages and the last index leaf page and inserting, by the linear pre-splitter, one or more index leaf page identifiers and index key metadata associated with each of the one or more index leaf pages into one or more index non-leaf pages. A computer system and a computer program product corresponding to the above method are also disclosed herein.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Aspects of the present disclosure and certain features, advantages and details thereof, are explained more fully below with reference to the non-limiting examples illustrated in the accompanying figures. Descriptions of well-known materials, fabrication tools, processing techniques, etc., are omitted to avoid obscuring the disclosure with unnecessary detail. It should be understood, however, that the detailed description and the specific examples, while indicating aspects of the invention, are given by way of illustration only and not by way of limitation. Various substitutions, modifications, additions and/or arrangements, within the spirit and/or scope of the underlying inventive concepts will be apparent to those skilled in the art from this disclosure.

Embodiments of the present invention provide systems, methods, and computer program products to maintain a DBMS index B-Tree during linear sequential inserts by determining when an index leaf page space limit is about to be reached (e.g., next to last index leaf page is being consumed) and executing an index pre-split operation (e.g., linear pre-splitter) to create a range of index leaf pages before a last index leaf page is full (e.g., index leaf page space exhausted). When a range of index leaf pages are created in a pre-split operation, individual and synchronized index leaf page split operations can be avoided. Further, embodiments of the present invention can be considered to operate asynchronously as index pre-splitting establishes index leaf pages in advance of an INSERT operation consuming the last of available index leaf pages. An example of a DBMS linear sequential insert is shown below:

```
CREATE TABLE TB (ACCOUNT_ID BIGINT NOT NULL,
BALANCE DECIMAL (11,2) NOT NULL,
STATUS CHAR(2), ...), etc.;
CREATE INDEX IX ON TB (ACCOUNT_ID, BALANCE);
CREATE SEQUENCE ACCOUNT_SEQ INCREMENT BY 1;
INSERT INTO TB VALUES (NEXT VALUE FOR ACCOUNT_SEQ,
BALANCE, ...);
```

The Structured Query Language (SQL) and/or Data Definition Language (DDL) instructions shown above, creates a table identified as "TB" (e.g., CREATE TABLE TB), key fields are identified to be indexed (e.g., ACCOUNT_ID, BALANCE) and an index sequence (e.g., CREATE SEQUENCE) is set to automatically generate sequential values (e.g., ACCOUNT_SEQ) as data is inserted to table "TB" and the associated index "IX." Continuing with the example, values are inserted into the specified table (e.g., INSERT INTO TB) and as each row is inserted into table "TB", an associated key value is assigned (e.g., inserted) in a B-Tree leaf within an index leaf page and in a position in the B-Tree where an index key value is located between a lower and higher magnitude value (e.g., sorted order). In this example, the index B-Tree can consume index leaf pages in an increasing order (e.g., index key values increase sequentially). As each data insertion proceeds, embodiments of the present invention can monitor when the next to last index leaf page is being consumed (e.g., filled) and can create a range of B-Tree leave pages to store index key values being inserted sequentially. It should be noted that the prior example uses the CREATE SEQUENCE statement and is one example that can comprise a linear sequential growth operation where commercial and/or custom DBMS products can implement a variety of methods to establish linear sequential growth control. Embodiments of the present invention can be associated to any implementation of DBMS that operates index B-Tree and can perform linear sequential growth insertions.

Embodiments of the present invention will now be described in detail with reference to the figures. It should be noted that references in the specification to "an exemplary embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure or characteristic is described in connection with an embodiment, it is submitted that it is within the knowledge of one skilled in the art to affect such feature, structure or characteristic in connection with other embodiments whether or not explicitly described.

Figure 1:
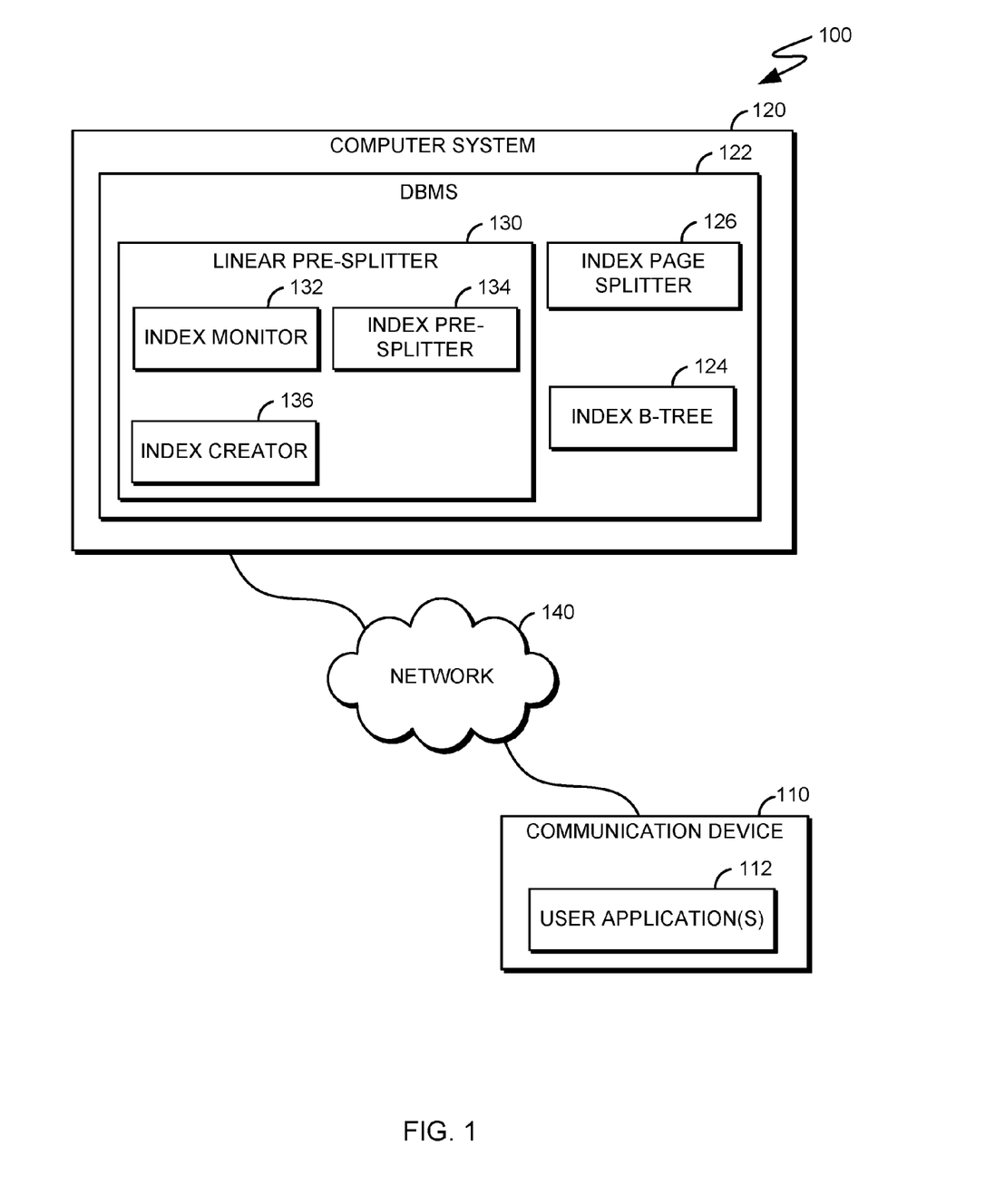
FIG. 1 illustrates a functional block diagram of a computing environment, in accordance with an embodiment of the present invention.

FIG. 1 illustrates a functional block diagram of computing environment 100, in accordance with an embodiment of the present invention. Computing environment 100 comprises COMMUNICATION DEVICE 110, and COMPUTER SYSTEM 120, interconnected via NETWORK 140. COMMUNICATION DEVICE 110 and COMPUTER SYSTEM 120 can be desktop computers, laptop computers, specialized computer servers, or the like. In certain embodiments, COMMUNICATION DEVICE 110 and COMPUTER SYSTEM 120 represent computer systems utilizing clustered computers and components acting as a single pool of seamless resources via NETWORK 140. For example, such embodiments can be used in data center, cloud computing, storage area network (SAN), and network attached storage (NAS) applications. In general, COMMUNICATION DEVICE 110 and COMPUTER SYSTEM 120 are representative of any electronic devices, or combination of electronic devices, capable of executing computer readable program instructions, as described in detail with regard to FIG. 4.

In one embodiment of the present invention, COMMUNICATION DEVICE 110 comprises USER APPLICATION(S) 112. USER APPLICATION(S) 112 can be a plurality of USER APPLICATION(S) 112 within COMMUNICATION DEVICE 110. USER APPLICATION(S) 112 can be an application used to perform operations such as, but not limited to, retrieving and managing data within DBMS 122 and can comprise any combination of commercial or custom software products associated with data retrieval and maintenance of DBMS 122.

In one embodiment of the present invention, NETWORK 140 can be, for example, a local area network (LAN), a wide area network (WAN) such as, the Internet, or a combination of the two, and include wired, wireless, or fiber optic connections. In general, NETWORK 140 can be any combination of connections and protocols that will support communications between COMMUNICATION DEVICE 110 and COMPUTER SYSTEM 120, in accordance with an embodiment of the present invention.

In one embodiment of the present invention, DBMS 122 can be a plurality of DBMS 122 within COMPUTER SYSTEM 120. DBMS 122 comprises, INDEX B-TREE 124, INDEX PAGE SPLITTER 126 and LINEAR PRE-SPLITTER 130. DBMS 122 can comprise any combination of commercial or custom devices and/or software products associated with organizing a collection of data which implements index B-Tree technology and can perform sequential inserts where index key values grow in a linear pattern.

In one embodiment of the present invention, INDEX B-TREE 124 can be a plurality of INDEX B-TREES 124 within DBMS 122. INDEX B-TREE 124 can comprise one or more index B-Tree structures that can organize index references associated to index key fields defined in DBMS 122 tables. Further, INDEX B-TREE 124 can also comprise one or more index leaf pages and one or more index non-leaf pages. An index leaf page can comprise one or more B-Tree leaves and index leaf page position identifiers that can store index leaf page position in an index B-Tree. For example, an index leaf page can comprise an identifier of a prior index leaf page (e.g., prior index leaf page identifier) and an identifier of a next index leaf page (e.g., next index leaf page identifier) forming, known by one skilled in the art as, a linked list. When an index leaf page has no next index leaf page then the index page can be considered to be a last index leaf page. It should be noted that index leaf page size and B-Tree leaf size can be predetermined and based on factors such as, but not limited to, DBMS configuration, index data type and operating system limitations. It should be further noted that the quantity of B-Tree leaves that can comprise an index leaf page can be determined based on the predetermined index leaf page size and B-Tree leaf size. An index non-leaf page can be a reference table (e.g., DBMS internal index) comprising information (e.g., metadata) about index leaf pages comprising an index B-Tree. An index non-leaf page can comprise data such as, but not limited to, index leaf page identifiers, high/maximal key value and low/minimal key value associated with each index leaf page. In embodiments of the present invention, INDEX B-TREE 124 can comprise any combination of commercial or custom devices and/or software products associated with DBMS 122.

In one embodiment of the present invention, INDEX PAGE SPLITTER 126 can be a plurality of INDEX PAGE SPLITTERS 126 within DBMS 122. INDEX PAGE SPLITTER 126 can monitor and operate index page splits (e.g., synchronous split). INDEX PAGE SPLITTER 126 can comprise any combination of commercial or custom devices and/or software products associated with DBMS 122.

In one embodiment of the present invention, LINEAR PRE-SPLITTER 130 can be a plurality of LINEAR PRE-SPLITTERS 130 within DBMS 122. LINEAR PRE-SPLITTER 130 comprises, INDEX MONITOR 132, INDEX PRE-SPLITTER 134 and INDEX CREATOR 136. In embodiments of the present invention, LINEAR PRE-SPLITTER 130 can comprise any combination of commercial or custom devices and/or software products associated with operating index B-Tree splitting in lieu of INDEX PAGE SPLITTER 126 when sequential linear inserts are performed (e.g., performing an asynchronous split). It should be noted that in some embodiments of the present invention, INDEX PAGE SPLITTER 126 can comprise LINEAR PRE-SPLITTER 130 in part or entirely. For example, INDEX MONITOR 132 can call INDEX PAGE SPLITTER 126 for non-sequential insert operations and for sequential linear insert operations, INDEX PAGE SPLITTER 126 can execute LINEAR PRE-SPLITTER 130.

In one embodiment of the present invention, INDEX MONITOR 132 can be a plurality of INDEX MONITORS 132 within LINEAR PRE-SPLITTER 130. INDEX MONITOR 132 can monitor DBMS 122 activity for linear sequential insertion operations and/or INDEX B-TREE 124 index leaf page status to determine if an index insertion is consuming a next to last index leaf page. If INDEX MONITOR 132 determines an index pre-split should be executed, then processing can be proceed toward INDEX PRE-SPLITTER 134, otherwise INDEX MONITOR 132 continues monitoring DBMS 122 activity. It should be noted that some embodiments of the present invention can identify a predetermined number of index leaf pages from a last index leaf page (e.g., distance from last index page) as an activation point to perform an index pre-split.

In one embodiment of the present invention, INDEX PRE-SPLITTER 134 can be a plurality of INDEX PRE-SPLITTERS 134 within LINEAR PRE-SPLITTER 130. INDEX PRE-SPLITTER 134 can determine a quantity of key entries being performed by a linear sequential insertion and can determine a quantity of index leaf pages needed to be created during an index pre-split. When INDEX PRE-SPLITTER 134 completes processing, process execution can be sent toward INDEX CREATOR 136.

In one embodiment of the present invention, INDEX CREATOR 136 can be a plurality of INDEX CREATORS 136 within LINEAR PRE-SPLITTER 130. INDEX CREATOR 136 can perform operations on INDEX B-TREE 124 such as, but not limited to, creating index leaf page(s), creating B-Tree leaves, linking index leaf pages (e.g., associate prior index leaf page and/or next index leaf page) and updating index non-leaf page(s).

Figure 2:
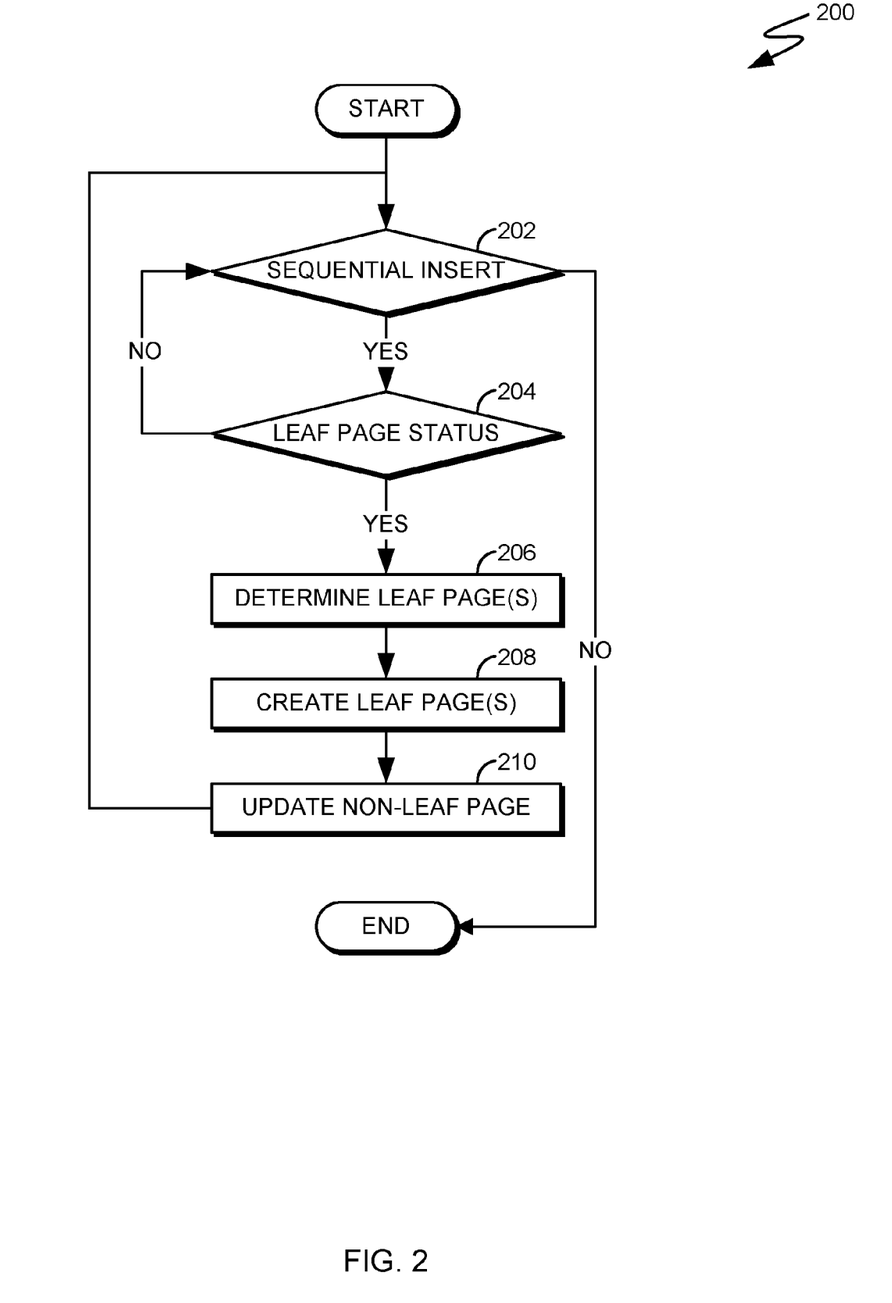
FIG. 2 illustrates a flowchart of linear pre-splitter, in accordance with an embodiment of the present invention.

FIG. 2 illustrates a flowchart of linear pre-splitter, in accordance with an embodiment of the present invention. Linear pre-splitter 200, comprises operations SEQUENTIAL INSERT 202, LEAF PAGE STATUS 204, DETERMINE LEAF PAGE(S) 206, CREATE LEAF PAGE(S) 208 and UPDATE NON-LEAF PAGE 210.

In operation SEQUENTIAL INSERT 202, INDEX MONITOR 132 can determine if a linear sequential insert is being processed by DBMS 122. If a linear sequential insert is being processed, then operation proceeds toward operation LEAF PAGE STATUS 204, otherwise LINEAR PRE-SPLITTER 130 flow ends until a next DBMS 122 index insert operation is received. It should be noted that linear sequential insertion can be detected by techniques such as, but not limited to, receiving DBMS 122 table column index definitions as an indicator that an index is sequentially controlled and detecting INSERT operation processing by DBMS 122.

Operation LEAF PAGE STATUS 204, can receive a current index leaf page identifier (e.g., index leaf page being consumed), affected by a DBMS 122 table row insert. Operation LEAF PAGE STATUS 204 can receive the index leaf page position identifier for the next index leaf page identifier and then receive the next leaf page's index leaf page position identifier to determine if the next index leaf page is the last index leaf page in the index B-Tree. It should be noted that the last index leaf page can comprise a next index leaf page identifier value such as, but not limited to, a null, end, etc. to indicate that the last index leaf page has been reached (e.g., end of linked list). Based on the linked list search, operation LEAF PAGE STATUS 204 can determine if the current index leaf page identifier is the next to last index leaf page being operated (e.g., filled) by DBMS 122. If the next to last index leaf page is being filled and/or a predetermined distance from the last index leaf page, then INDEX PRE-SPLITTER 134 can be called and operation proceeds toward operation DETERMINE LEAF PAGE(S) 206. If the next to last index leaf page and/or predetermined distance from the last index page is not being filled, then operation loops toward operation SEQUENTIAL INSERT 202. It should be noted that in some embodiments of the present invention the next to last index leaf page can be determined by techniques such as, but not limited to, receiving a next to last leaf page identified in the index non-leaf page (e.g., row prior to last row of a sorted index non-leaf page). For example, the prior index leaf page identifier of a last index leaf page identifier in the index non-leaf page can be identified as the next to last index leaf page. It should be further noted that identification of a last index leaf page can vary based on INDEX B-TREE 124 data structure implementation.

Operation DETERMINE LEAF PAGE(S) 206, can determine how many index leaf pages can be created to comprise the current INSERT operation being processed by DBMS 122. INDEX PRE-SPLITTER 134 can receive B-Tree leaf size and index leaf page size to calculate the quantity of B-Tree leaves per index leaf page that can be stored. In embodiments of the present invention, INDEX PRE-SPLITTER 134 can determine the quantity of index leaf pages to be created by techniques such as, but not limited to, inspecting the INSERT operation being processed to receive how many row insertions remain. In other embodiments of the present invention, INDEX PRE-SPLITTER 134 can indicate that a new index pre-split be performed as each next to last index leaf page is being filled. Further, INDEX PRE-SPLITTER 134 can receive an index non-leaf page "high key" (e.g., largest key value of an index leaf page). Based on the last index leaf page high key and the quantity of B-Tree leaves comprising an index leaf page, INDEX PRE-SPLITTER 134 can determine the high key for each index leaf page to be created. It should be noted that in some embodiments of the present invention, INDEX PRE-SPLITTER 134 can determine a corresponding "low key" based on incrementing the prior index leaf page high key to indicate the lowest index key value of the associated current index leaf page. When operation DETERMINE LEAF PAGE(S) 206 completes, processing proceeds toward operation CREATE LEAF PAGE(S) 208.

Operation CREATE LEAF PAGE(S) 208, can create one or more index leaf pages via INDEX CREATOR 136 based on receiving operation DETERMINE LEAF PAGE(S) 206 information. Further, INDEX CREATOR 136, can link the one or more index leaf pages in sequence and associate the former last index leaf page with the first of the newly created one or more index leaf pages (e.g., extending the linked list by the one or more index leaf pages). When operation CREATE LEAF PAGE(S) 208 completes, processing proceeds toward operation UPDATE NON-LEAF PAGE 210.

Operation UPDATE NON-LEAF PAGE 210, can update an index non-leaf page based on the one or more index leaf pages processed in operation CREATE LEAF PAGE(S) 208. INDEX CREATOR 136 updates the index non-leaf page to comprise information such as, but not limited to, index leaf page identifiers for the one or more index leaf pages and corresponding high key and/or low key value (e.g., index key metadata). When operation UPDATE NON-LEAF PAGE 210 completes, processing loops toward operation SEQUENTIAL INSERT 202.

Figure 3:
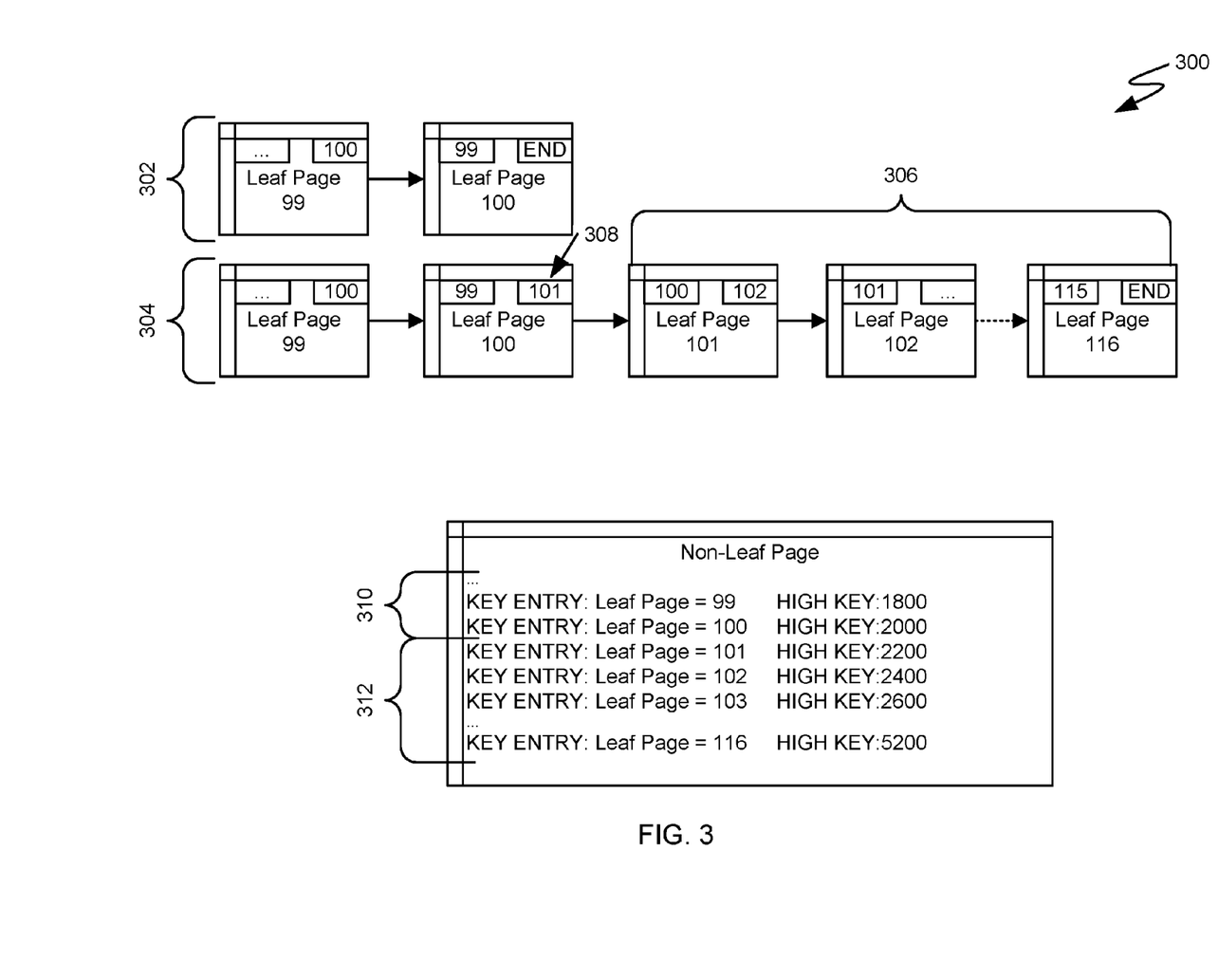
FIG. 3 illustrates index B-Tree pre-splitting operation, in accordance with an embodiment of the present invention.

FIG. 3 illustrates index B-Tree pre-splitting operation, in accordance with an embodiment of the present invention.

The index B-Tree pre-splitting operation 300 represents an example of LINEAR PRE-SPLITTER 130 operation performing an example SQL command such as, but not limited to, "INSERT INTO TB VALUES (NEXT VALUE FOR ACCOUNT_SEQ, BALANCE, . . . )." Each FIG. 3 index leaf page is identified as 'Leaf Page' and each index leaf page comprises index leaf page position identifiers comprising a prior index leaf page identifier and a next index leaf page identifier. Each index leaf page is linked via the prior index leaf page identifier and the next index leaf page identifier (e.g., forming a linked list). The last index leaf page in an index B-Tree comprises the next index leaf page identifier indicated with 'END'. It should be noted that each index leaf page can comprise a range of B-Tree leaves (not depicted) where each B-Tree leaf identifies an index key value.

Item Index leaf pages before Linear Pre-splitter 302 can represent the last two index leaf pages of an index B-Tree. In this example INDEX MONITOR 132 can detect that an insert command is for a linear sequential insertion operation and while DBMS 122 is filling remaining B-Tree leaves in 'Leaf Page 99', INDEX MONITOR 132 can determine 'Leaf Page 99' is the next to last index leaf page based on 'Leaf Page 100' having a next index leaf page identifier comprising 'END'.

In the example, INDEX PRE-SPLITTER 134 can determine that each index leaf page can comprise two hundred (200) B-Tree leaves and the insert command being processed will create up to three thousand four hundred (3,400) records, resulting in the need for sixteen (16) additional index leaf pages. Item Index leaf pages after Linear Pre-splitter 304 represents the index B-Tree expansion comprising newly created index leaf pages after LINEAR PRE-SPLITTER 130 completes processing.

Item Added index leaf pages after Linear Pre-splitter 306 represents the creation and linking of sixteen (16) additional index leaf pages. Once 'Leaf Page 101' through 'Leaf Page 116' are created, item Index leaf page linkage after Linear Pre-splitter 308 indicates that the former last 'Leaf Page 100' is joined to 'Leaf Page 101' by updating the next index leaf page identifier from 'END' to '101' to complete the pre-split of the index B-Tree structure.

With the index B-Tree modification complete, INDEX CREATOR 136 can update the index non-leaf page to identify the added index leaf page(s). Item Index non-leaf pages before Linear Pre-splitter 310 represents the index non-leaf page contents prior to creation of 'Leaf Page 101' through 'Leaf Page 116'. Item Index non-leaf pages after Linear Pre-splitter 312 represents the insertion of the created 'Leaf Page 101' through 'Leaf Page 116' in the index non-leaf page. Each KEY ENTRY comprises an associated HIGH KEY to identify the highest index key value available in each corresponding index leaf page.

Figure 4:
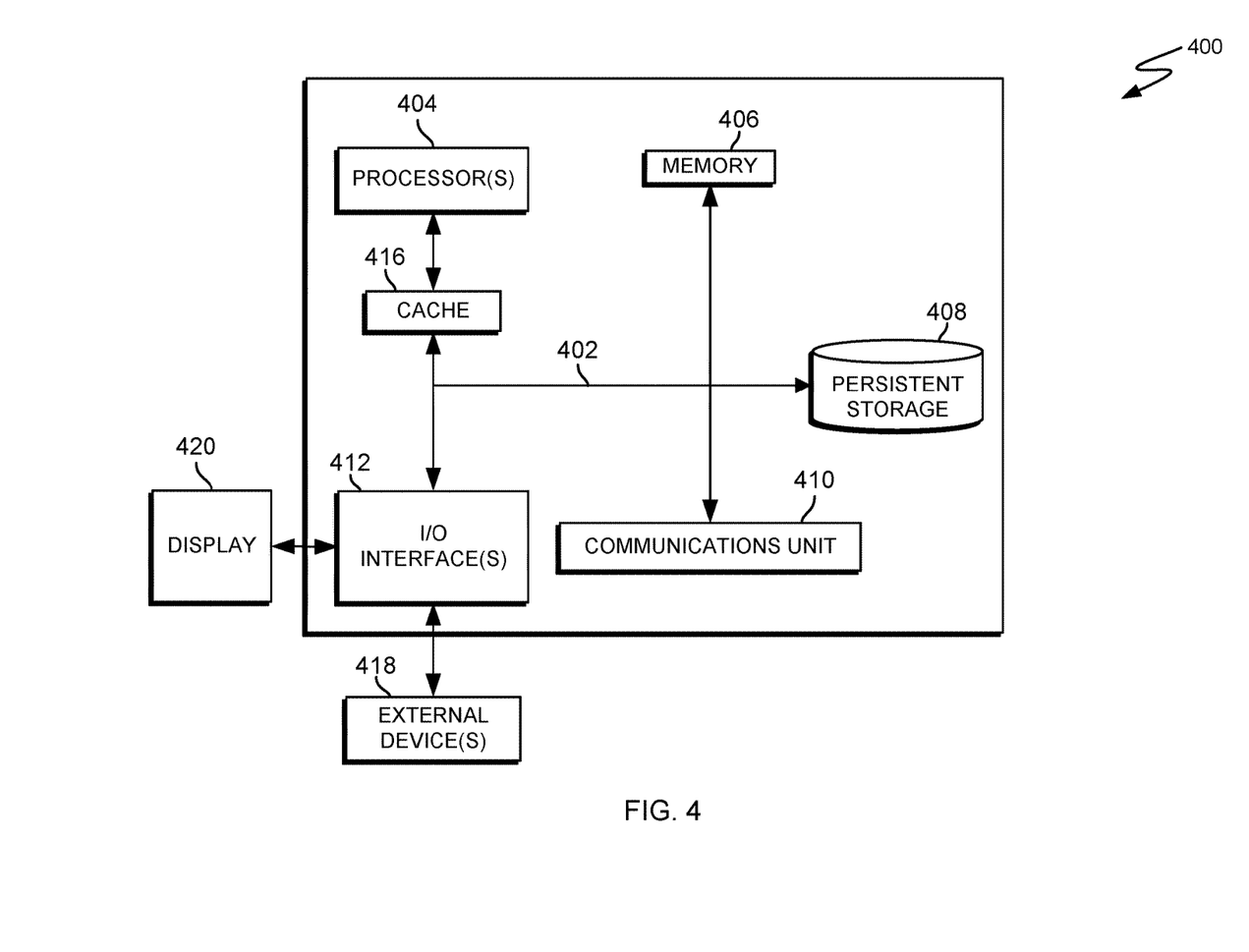
FIG. 4 illustrates a block diagram of components of the server and/or the computing device, in accordance with an embodiment of the present invention.

FIG. 4 depicts a block diagram of components of COMMUNICATION DEVICE 110 and COMPUTER SYSTEM 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer system 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as, microprocessors, communications and network processors, etc.), system memory, peripheral devices, and any other hardware components within a system. For example, communications fabric 402 can be implemented with one or more buses.

Computer system 400 includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as, microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as, a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as, punchcards or raised structures in a groove having instructions recorded thereon, and any suitable combination of the foregoing. A computer readable storage medium, as used herein, is not to be construed as being transitory signals per se, such as, radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as, Smalltalk, C++ or the like, and conventional procedural programming languages, such as, the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for index B-tree page creation associated with linear sequential insertions in database management systems (DBMS), the computer program product comprising:
   one or more computer readable storage media and program instructions stored on the one or more computer readable storage media, the program instructions comprising:
   program instructions to, receive, by a linear pre-splitter, a current index leaf page for linear sequential insertion;
   program instructions to, asynchronously create, by the linear pre-splitter, one or more index leaf pages wherein the current index leaf page is in a predetermined position at least one page away from a last index leaf page, without transferring data from existing leaf pages to the created one or more index leaf pages during the linear sequential insertion;
   program instructions to, update, by the linear pre-splitter, one or more index leaf page position identifiers associated with the one or more index leaf pages wherein the one or more index leaf page position identifiers link the one or more index leaf pages and the last index leaf page; and
   program instructions to, insert, by the linear pre-splitter, one or more index leaf page identifiers and index key metadata associated with each of the one or more index leaf pages into one or more index non-leaf pages.

2. The computer program product of claim 1, further comprising:
   program instructions to, detect, by the linear pre-splitter, the linear sequential insertion wherein the linear sequential insertion is based on identifying at least one of a predetermined column index definition and a DBMS insert operation.

3. The computer program product of claim 1, wherein, the index key metadata comprises at least one of a high key and a low key associated with a respective minimal key value and a maximal key value of each of the one or more index leaf pages.

4. The computer program product of claim 1, wherein program instructions to, asynchronously create the one or more index leaf pages is based on at least one of a predetermined quantity of the one or more index leaf pages and determining the quantity of the one or more index leaf pages based a quantity of B-Tree leaves inserts.

5. The computer program product of claim 4, wherein determining the quantity of the one or more index leaf pages is based on receiving the quantity of B-Tree leaves inserts and calculating a quantity of the one or more index leaf pages comprising a quantity of B-Tree leaves.

6. The computer program product of claim 1, wherein the predetermined position at least one page away from a last index leaf page is based on determining a position of the current index leaf page and a position of the last index leaf page.

7. The computer program product of claim 1, wherein each of the one or more index leaf pages comprise an index leaf page identifier and the one or more index leaf page position identifiers.

8. A computer system for index B-tree page creation associated with linear sequential insertions in database management systems (DBMS), the computer system comprising:
   one or more computer processors;
   one or more computer readable storage media;
   program instructions stored on the one or more computer readable storage media for execution by at least one of the one or more computer processors, the program instructions comprising:
   program instructions to, receive, by a linear pre-splitter, a current index leaf page for linear sequential insertion;
   program instructions to, asynchronously create, by the linear pre-splitter, one or more index leaf pages wherein the current index leaf page is in a predetermined position at least one page away from a last index leaf page, without transferring data from existing leaf pages to the created one or more index leaf pages during the linear sequential insertion;
   program instructions to, update, by the linear pre-splitter, one or more index leaf page position identifiers associated with the one or more index leaf pages wherein the one or more index leaf page position identifiers link the one or more index leaf pages and the last index leaf page; and
   program instructions to, insert, by the linear pre-splitter, one or more index leaf page identifiers and index key metadata associated with each of the one or more index leaf pages into one or more index non-leaf pages.

9. The computer system of claim 8, further comprising:
   program instructions to, detect, by the linear pre-splitter, the linear sequential insertion wherein the linear sequential insertion is based on identifying at least one of a predetermined column index definition and a DBMS insert operation.

10. The computer system of claim 8, wherein, the index key metadata comprises at least one of a high key and a low key associated with a respective minimal key value and a maximal key value of each of the one or more index leaf pages.

11. The computer system of claim 8, wherein program instructions to, asynchronously create the one or more index leaf pages is based on at least one of a predetermined quantity of the one or more index leaf pages and determining the quantity of the one or more index leaf pages based a quantity of B-Tree leaves inserts.

12. The computer system of claim 11, wherein determining the quantity of the one or more index leaf pages is based on receiving the quantity of B-Tree leaves inserts and calculating a quantity of the one or more index leaf pages comprising a quantity of B-Tree leaves.

13. The computer system of claim 8, wherein the predetermined position at least one page away from a last index leaf page is based on determining a position of the current index leaf page and a position of the last index leaf page.

\* \* \* \* \*